Oct. 23, 1934.                C. G. REETZ                1,977,972
                          POWER SEAL FOR BATTERIES
                            Filed May 6, 1932
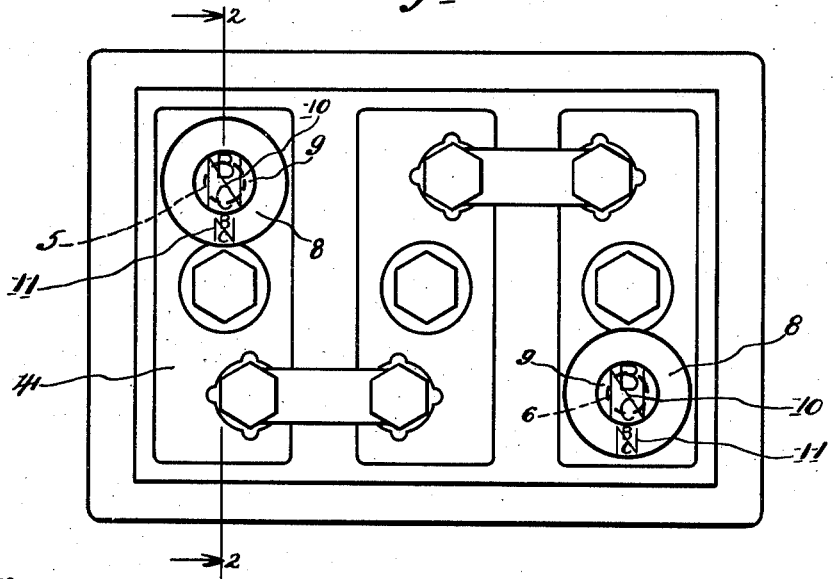
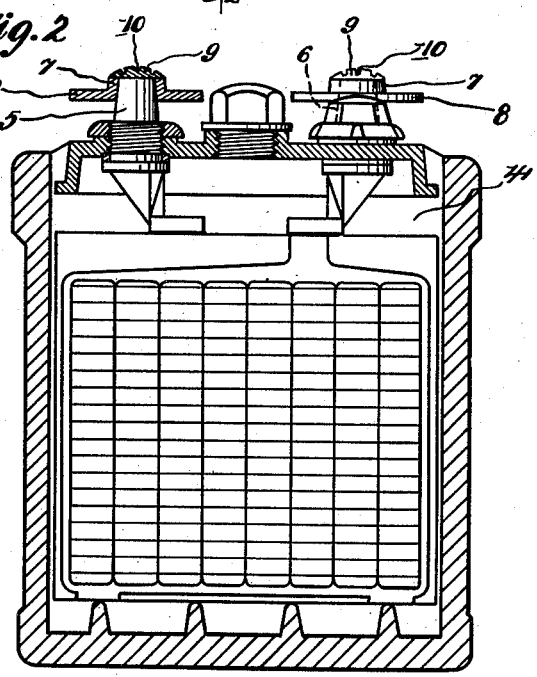
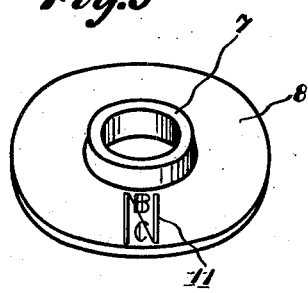
Inventor
Carl G. Reetz
By Stryker & Stryker
Attorneys Patented Oct. 23, 1934

1,977,972

UNITED STATES PATENT OFFICE 1,977,972

POWER SEAL FOR BATTERIES

Carl G. Reetz, St. Paul, Minn., assignor to National Battery Company, St. Paul, Minn., a corporation of Delaware Application May 6, 1932, Serial No. 609,703

5 Claims. (Cl. 136—181)

This invention relates to a device adapted to be secured to a terminal post of a battery to guard against unauthorized use of the battery, the device being applied by the manufacturer as an assurance to the purchaser that the battery has not been used at the time of the purchase of the same.

By mere inspection of the exterior of an ordinary storage battery or by the usual simple test of specific gravity of the electrolyte, it is seldom possible to determine whether or not a battery has been used. This has led unscrupulous dealers to sell used batteries as new ones to the discredit of the manufacturer in cases where such used batteries do not give satisfactory service. The device of this invention is designed to guard against the activities of such dealers.

It is my object to provide a novel device for attachment to the binding posts of batteries whereby use of the batteries without detection is guarded against.

A particular object is to provide, in combination with a battery post, an obstruction to the attachment of a clamp or other means for securing an electric conductor to the post and a seal, preferably bearing a legend or identifying mark, which must be destroyed or broken when the obstruction is removed, or which must be reformed by the proper die if the obstruction is to be replaced.

The invention will be best understood by reference to the accompanying drawing in which:

Figure 1 is a plan view of a battery with the invention applied thereto;

Fig. 2 is a section taken on the line 2—2 of Fig. 1; and

Fig. 3 is a perspective view of one of the guards separate from the battery and without the attaching seal.

In the drawing the numeral 4 indicates a storage battery of common type having terminal posts 5 and 6 to which the electric conductors are secured when the battery is to be used. On at least one of the posts 5 and 6, a collar 7 is placed. This collar is preferably formed with a projecting flange 8 so that an efficient obstruction is presented to the attachment of power conductors to the post. The collar and flange are constructed from lead or other acid-resistant material.

Extending across the upper end of the post and top of collar 7 and securely uniting said collar to the post is a circular seal 9. This seal is applied in molten form by flowing it into place after the collar 7 has been applied to the terminal. Impressed into the upper surface of the seal 9 is a trade-mark or legend 10 identifying the manufacturer. The seal 9 may be constructed from acid-resistant solder or other metal adapted to securely unite with the post and collar. The legend 10 preferably extends adjacent to the periphery of the seal so that it is necessary to mutilate the legend, as well as the seal, when the collar 7 and flange 8 are removed from the post, as when the battery is to be used. The upper surface of the flange 8 affords space for directions and the further identifying legend 11. The latter may be like the legend 10 on the seal 9.

It will be evident from the foregoing description that when a manufacturer has once applied the device to a battery post it is necessary, in placing the battery in service, to make power connections with the terminal posts and to do this the obstruction afforded by the collar 7 and flange 8 must be removed. The peripheral portion of the seal, together with the legend thereon is broken away when the collar is removed. If an attempt is made to replace the collar and to give it its original appearance, the seal with its legend must be reformed. This requires a die and die material like that of the manufacturer and skillful application thereof to the terminal post. Thus any unauthorized replacement of the guard is made so difficult that, in practice, the device affords efficient protection.

I have illustrated my improved guard as applied to both the positive and negative terminal posts 5 and 6 but in most cases sufficient protection is afforded by applying the device to one post only, for example, the negative post. Numerous modifications of the device are contemplated within the broad scope of the invention as defined in the appended claims.

Having described my invention, what I claim as new and desire to protect by Letters Patent is:

1. The combination with a storage battery having a terminal post projecting therefrom, said post being adapted to be embraced by an electric conductor, of means for obstructing the attachment of an electric conductor to said post comprising, a relatively thin annular guard mounted on said post and extending substantially to the outer end of said post, and a fragile seal capping said post and uniting said guard to said post, said seal having impressed therein an identifying legend which is relatively inimitable.

2. The combination with a storage battery having a terminal post projecting therefrom, said post being adapted to be embraced by an electric conductor, of means for obstructing the attachment of an electric conductor to said post comprising, a relatively thin guard mounted on said post near the upper end thereof and spaced from the outer surface of said battery, and a fragile seal capping said post and uniting said guard to said post, said seal having impressed therein an identifying legend which is relatively inimitable.

3. The combination with a storage battery having a terminal post projecting therefrom, said post being adapted to be embraced by an electric conductor, of means for obstructing the attachment of an electric conductor to said post comprising, an annulus mounted on said post and spaced from the outer surface of said battery, said annulus having an integral portion extending substantially to the outer end of said post, and a fragile seal uniting said portion to said post, said seal having impressed therein an identifying legend which is relatively inimitable.

4. The combination with a storage battery having a terminal post extending upwardly beyond the upper surface thereof, the said post being adapted to be embraced by an electric conductor, of means for obstructing the attachment of an electric conductor to said post consisting of a relatively thin annulus mounted horizontally on said post relatively near the end thereof and spaced from the upper surface of said battery, a collar upstanding from said annulus and extending to substantially the end of said post, and a fragile seal uniting said collar to said post, said seal having impressed therein identifying legends which are relatively inimitable.

5. The combination with a storage battery having a terminal post extending upwardly beyond the upper surface thereof, said post being adapted to be embraced by an electric conductor, of means for obstructing the attachment of an electric conductor to said post comprising, a guard having a relatively thin annulus mounted horizontally on said post near its upper end, said annulus being spaced from the upper surface of said battery and a fragile seal capping the upper end of said post and uniting said guard to said post.

CARL G. REETZ.